UNITED STATES PATENT OFFICE.

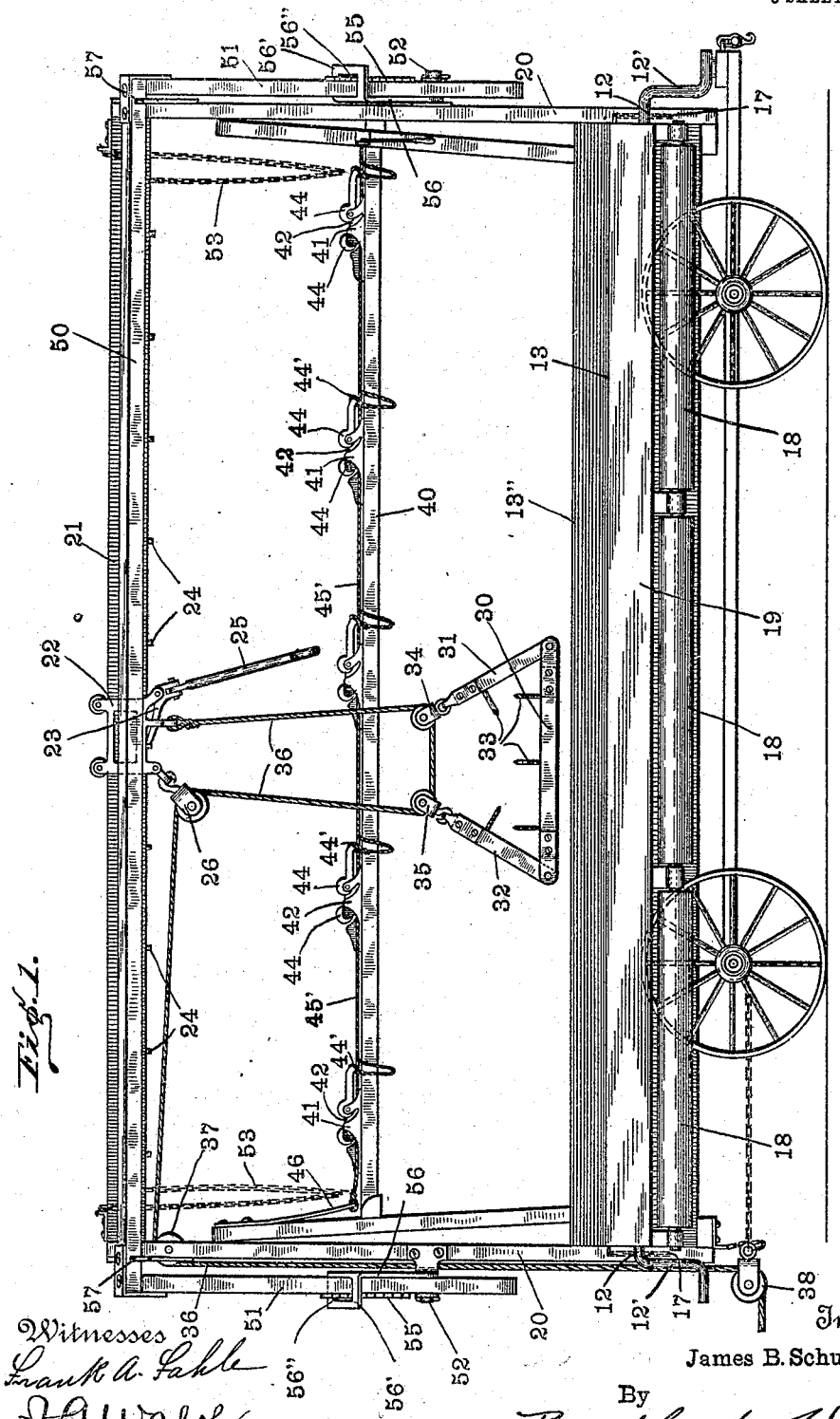

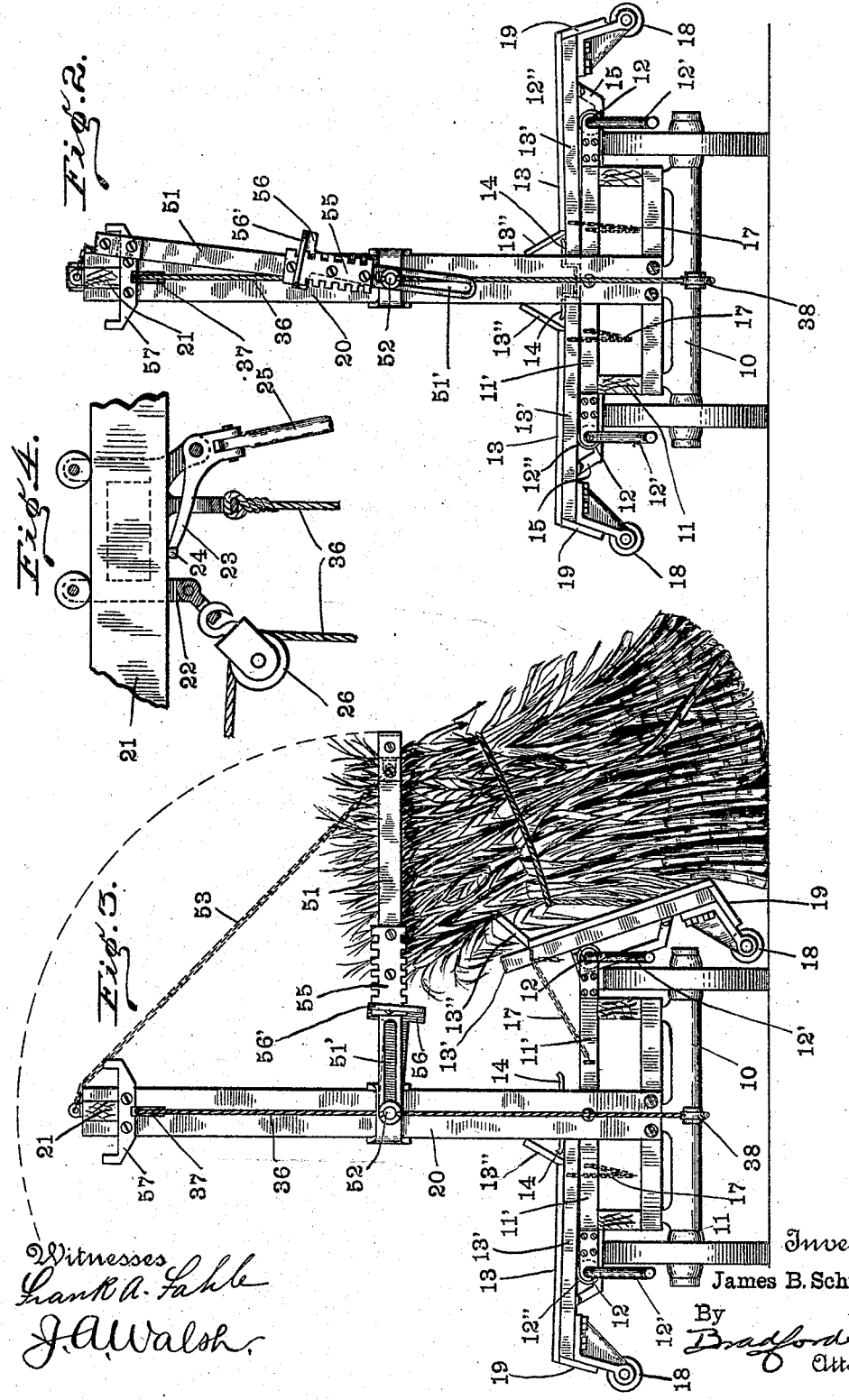

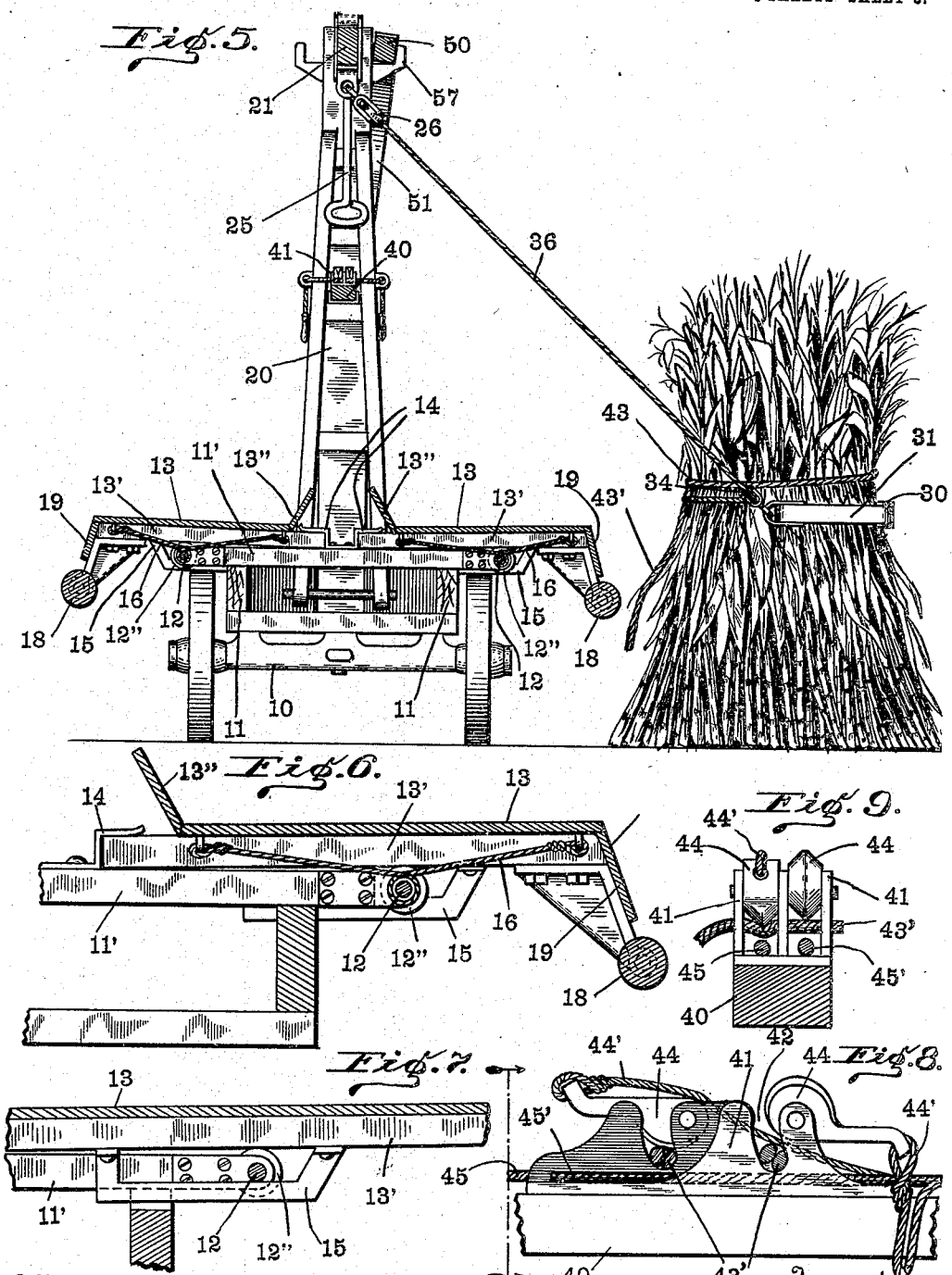

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

SHOCK-LOADER.

939,335.  Specification of Letters Patent.  Patented Nov. 9, 1909.

Application filed April 17, 1905, Serial No. 256,081.  Renewed February 8, 1908.  Serial No. 414,980.

*To all whom it may concern:*

Be it known that I, JAMES B. SCHUMAN, a citizen of the United States, residing at Indianapolis, in the county of Marion and State of Indiana, have invented certain new and useful Improvements in Shock-Loaders, of which the following is a specification.

In the harvesting of corn and similar stalk crops it is customary to form shocks of the crop in the field and permit the shocks to remain standing through the fall in order to properly cure. The shocks are then usually dissected in the field and loaded upon racks to be carried to a distant point and treated by the shredder. When the shocks have weathered for a considerable period the stalks are very dry and brittle, and, consequently, a very material portion of the fodder is broken off and left in the field, and thus lost. Heretofore devices have been provided for lifting the shocks bodily onto a rack for transportation from the field to the shredder, but difficulty has been experienced in the operation of said devices in unloading the shocks from the rack in the neighborhood of the shredder.

The object of my present invention is to produce a comparatively cheap structure by means of which the shocks may be readily lifted bodily and may be then discharged in such manner as to be set butt end down at any desired point.

The accompanying drawings illustrate my invention.

Figure 1 is a side elevation of a farm wagon provided with my improvements; Fig. 2 an end elevation; Fig. 3 another end elevation showing the manner of discharging the shocks; Fig. 4 a detail vertical section of the adjustable carriage for the lifted mechanism; Fig. 5 a transverse vertical section with a shock in position to be lifted onto the structure; Fig. 6 an enlarged vertical section of the tilting receiving platform; Fig. 7 a sectional detail of a portion of the parts shown in Fig. 6; Fig. 8 an enlarged side elevation of a pair of the means for holding the loaded shocks in position; and Fig. 9 a section on line 9—9 of Fig. 8.

In the drawings, 10 indicates a suitable supporting running gear of any well known type provided with a bed 11. This bed 11 may be made to fit any ordinary running gear and be detachable therefrom if desired. The bed 11 consists in part of transverse bars 11', the ends of which support a pair of shafts 12 which run lengthwise of the structure and are each provided with a crank 12' by which it may be rotated. Transversely slidable on the bed 11 are two receiving platforms 13 13, one at each side of the medial line of the bed. Each of these receiving platforms 13 is formed of a plurality of transverse members 13' which are connected and covered by a suitable platform, the inner edge of which is preferably upturned as at 13" in order to prevent loose material from entering the parts at the middle. The members 13' project inward and are adapted to be inserted beneath clips 14 which are secured to the bars 11'. The shafts 12 carry at intermediate points, rollers 12", and the members 13' carry yokes 15 which pass beneath the adjacent shaft 12. In order to insure a positive movement of the receiving platforms in either direction a rope 16 is passed tightly around shaft 12 and its ends are attached to opposite sides of the platform 13, the arrangement being such that by rotating shaft 12, in one direction or the other, the platform attached thereto may be positively moved transversely of the bed a distance equal, or substantially equal, to the length of the opening in yoke 15. In order to limit the downward swing of the platform 13, a chain 17 is attached to the inner end of the platform and to an adjacent portion of the bed as shown in Fig. 3. The outer edge of each platform 13 is provided with a roller or series of rollers 18, and the arrangement of this roller is preferably below and slightly beyond the outer edge of the platform proper, the space between being bridged by an outwardly and downwardly inclined apron 19.

Erected from each end of the bed 11 are standards 20 20, the upper ends of which are firmly connected, either permanently or detachably by means of a longitudinal track or beam 21, which extends the entire length of the bed above the medial line. Mounted upon beam 21 and movable along it is a carriage 22 which is adapted to be held in any desired position along the length of the beam 21 by means of a pawl 23 pivoted on the carriage and adapted to engage any one of a series of pins or lugs 24 projecting from the underside of the beam 21. For convenience in operation of the pawl 23, I provide an operating link 25 which is pivoted to one arm of the pawl 23 on an axis at right angles to the axis of the pawl so as to permit a swing of the free end of the link to either side of the structure in order that it may be readily grasped by the operator. The pivotal mounting of the operating link permits yielding in case it is struck by the oncoming shocks—thus avoiding possibility of straining. Attached to the rear lower corner of the carriage 22 is a pulley block 26.

Any desired shock grappling and lifting mechanism may be attached to the carriage 22, as for instance the structure shown in the drawings. This shock grapple proper consists of a central or middle bar 30 and a pair of end bars 31 and 32 pivoted to the ends of the bar 30. Each of these bars is provided with inwardly projecting teeth 33 which are adapted to enter the shock transversely. Attached to the free end of bar 31 is a pulley block 34, and detachably attached to the end of bar 32 is a pulley block 35. The block 35 need not necessarily be detachably connected to the end of bar 32, but I prefer to so attach it for a reason which will appear. A lifting rope or cable has one end attached to the carriage 22. The cable is passed from the carriage through block 34, block 35, block 26 and from thence over suitable idlers or blocks 37 and 38, so that its other end may be attached to suitable draft devices. The cable 36 may be passed either to the front or to the rear of the wagon, but I prefer to carry it to the rear where it will be operated by a separate draft animal so that there will be no possibility of entanglement with the team used to propel the wagon.

In order to hold the lifted shocks upright upon the structure, I mount beneath the beam 21, a longitudinal bar 40 which is provided at various points in its length with means to which lasso ropes encircling the lifted shocks may be attached.

In order to facilitate the release of all of the shocks upon one side of the loaded structure, I provide two series of fastening means of such type that all of the fasteners of either series may be simultaneously released, and to this end I have provided devices such as are shown in Figs. 1, 8 and 9, each fastener consisting of a casing, the main body 41 having a slot 42 adapted to receive the end 43' of a lasso rope 43. Pivoted on the body 41 adjacent each slot 42 is a cam 44 adapted to be thrown into and out of engagement with the portions 43' of the rope 43 lying in the adjacent slot 42. Leading lengthwise of the bar 40 are two ropes 45, 45', and all of the cams 44 of one set are attached by flexible connections 44' with one of these ropes 45 or 45', while all of the other cams are similarly connected with the other of said ropes. Each of these ropes 45 and 45' is attached at one end to a spring 46 and at the other end is led to the forward end of the wagon, as shown in Fig. 1.

In order to insure the proper dumping of the loaded shocks, I provide a yoke which consists of a longitudinal bar 50 and end bars 51. The bar 50 runs the entire length of the structure and the bars 51 are slotted at their inner ends as at 51' and pivoted in these slots on studs 52 52 secured to the standards 20. The bar 50 is adapted to be swung to either side of the structure so as to be brought into coöperation with either one of the platforms 13 and its downward swing is limited by means of suitable chains 53. The effective length of the yoke, i. e., the distance of the bar 50 from the medial line of the structure, may be determined by an adjustable connection which consists of a notched plate 55 secured to each bar 50, and a pawl or catch 56 pivoted upon each stud 52. For convenience, I prefer to notch each edge of the plate 55 and the catch 56 is, therefore, provided with an outwardly turned lip 56' which is perforated as at 56'', the adjacent bar 51 and the plate 55 passing through this perforation. It will be seen that by this construction the catch 56 will remain in position by gravity no matter to which side of the wagon the bar 50 may be swung. Suitably notched supports 57 are secured to the upper end of each upright 20 in order to form a support for the bar 50 during the time of loading.

The operation is as follows: The wagon is driven alongside of a shock and a lasso 43 is thrown around its upper end, as shown in Fig. 5, the free end 43' of this lasso lying next the wagon. Pulley block 35 is then detached from arm 32 and the grapple 30—31—32 is passed around the shock, as shown in Fig. 5. Pulley block 35 is then hooked to the free end of arm 32 and carriage 22 is adjusted along beam 21 so as to be opposite that portion of the wagon to which the shock is to be brought. A pull is then exerted upon cable 36, and its first action is to draw the three members of the grapple tightly about the shock so as to compress it at its waist and force the pins 33 transversely into the shock. Further pull upon the cable draws the shock to the wagon and up upon the adjacent platform 13, rollers 18 serving to facilitate this movement. When the shock has been drawn up onto the platform 13 the free end 43' of the lasso 43 is thrown into the notch 42 of an adjacent fastener and the cam 44 thereof thrown down upon it so as to securely hold the shock in position. The wagon is then driven to another shock, preferably at the other side of the wagon, and the grapple carried to that side and the shock thrown up in the same manner upon the opposite platform 13. This operation is continued until the wagon is loaded, whereupon the wagon is driven to a desired point of discharge. The operator then swings bar 50 down to one side of the machine, adjusting it by means of the catches 56 and plates 55 to the proper distance from the middle of the wagon, as clearly illustrated in Fig. 3. The corresponding rope 45 or 45' is then pulled so as to simultaneously withdraw all of the cams 44 of that set, thus releasing all of the corresponding lassos 43. Thereupon the proper shaft 12 is rotated in the direction to withdraw the inner ends of the cross bars 13' from beneath the clips 14, whereupon the weight of the shocks will tip this platform upon the rollers 12''. The shocks of this side are thereupon dumped to the position shown in Fig. 3, the bar 50 preventing the tops of the shocks from being thrown outward. Bar 50 is then swung upward and over to the other side whereupon the dumped shocks will straighten up on the ground and the shocks upon the other side of the structure may be dumped in the same way.

I claim as my invention:

1. The combination, with a portable vehicle, of a transversely movable and vertically swingable platform mounted thereon, means for moving said platform transversely to permit it to swing vertically, and lifting mechanism arranged above said platform.

2. The combination, with a portable vehicle, of a transversely movable and vertically swingable platform mounted thereon, means for holding said platform in normal receiving position, means for moving said platform transversely to permit it to swing vertically, and lifting mechanism arranged above said platform.

3. The combination, with a portable vehicle, of a transversely movable and vertically swingable platform mounted thereon, means for moving said platform transversely to permit it to swing vertically, and a guard rail arranged above the platform in position to engage the upper ends of material loaded on said platform.

4. The combination, with a portable vehicle, of a transversely movable and vertically swingable platform mounted thereon, means for holding said platform in normal receiving position, means for moving said platform transversely to permit it to swing vertically, and a guard rail arranged above the platform in position to engage the upper ends of material loaded on said platform.

5. The combination, with a portable vehicle, of a receiving platform pivotally mounted thereon so as to swing vertically, means for normally retaining said platform in receiving position, and lifting mechanism arranged above said platform.

6. The combination, with a portable vehicle, of a receiving platform pivotally mounted thereon so as to swing vertically, means for normally retaining said platform in receiving position, means for engaging the outer upper portions of material supported upon said platform when said platform is tipped, and lifting mechanism arranged above said platform.

7. The combination, with a portable vehicle, of a receiving platform pivotally mounted thereon so as to swing vertically, means for normally retaining said platform in receiving position, and a plurality of clamping means arranged above said platform.

8. The combination, with a portable vehicle, of a receiving platform pivotally mounted thereon so as to swing vertically, means for normally retaining said platform in receiving position, a plurality of clamping means arranged above said platform, and means for simultaneously releasing said clamping means.

9. The combination, with a portable vehicle, of a receiving platform pivotally mounted thereon so as to swing vertically on an axis substantially parallel with the middle line of the carriage, means for normally retaining said platform in receiving position, a beam rigidly arranged above said platform, a carriage movably mounted on said beam, means for holding said carriage in a desired position along said beam, and lifting means carried by said carriage.

10. The combination, with a portable vehicle, of a pair of receiving platforms pivotally mounted thereon so as to swing vertically in opposite directions on axes substantially parallel with the middle line of the carriage, means for normally retaining said platform in receiving position, a beam rigidly arranged above said platform, a carriage movably mounted on said beam, means for holding said carriage in a desired position along said beam, and lifting means carried by said carriage.

11. The combination, with a portable vehicle, of a receiving platform pivotally mounted thereon so as to swing vertically on an axis substantially parallel with the middle line of the vehicle, means for normally retaining said platform in receiving position, a beam rigidly arranged above said platform, a carriage movably mounted on said beam, means for holding said carriage in a desired position along said beam, lifting means carried by said carriage, and a plurality of clamping means arranged above said platform.

12. The combination, with a portable vehicle, of a pair of receiving platforms pivotally mounted thereon so as to swing vertically in opposite directions on axes substantially parallel with the middle line of the vehicle, means for normally retaining said platforms in receiving position, a beam rigidly arranged above said platforms, a carriage movably mounted on said beam, means for holding said carriage in a desired position along said beam, lifting means carried by said carriage, and a plurality of clamping means arranged above said platforms.

13. The combination, with a portable vehicle, of a receiving platform pivotally mounted thereon so as to swing vertically on an axis substantially parallel with the middle line of the vehicle, means for normally retaining said platform in receiving position, a beam rigidly arranged above said platform, a carriage movably mounted on said beam, means for holding said carriage in a desired position along said beam, lifting means carried by said carriage, a plurality of clamping means arranged above said platform, and means for simultaneously releasing said clamping means.

14. The combination, with a portable vehicle, of a receiving platform pivotally mounted thereon so as to swing vertically on an axis substantially parallel with the middle line of the vehicle, means for normally retaining said platform in receiving position, a beam rigidly arranged above said platform, a carriage movably mounted on said beam, means for holding said carriage in a desired position along said beam, lifting means carried by said carriage, a plurality of clamping means arranged above said platform, and means for engaging the outer upper portions of material supported upon said platform when said platform is tipped.

15. The combination, with a portable vehicle, of a receiving platform pivotally mounted thereon so as to swing vertically on an axis substantially parallel with the middle line of the vehicle, means for normally retaining said platform in receiving position, a beam rigidly arranged above said platfrom, a carriage movably mounted on said beam, means for holding said carriage in a desired position along said beam, lifting means carried by said carriage, a plurality of clamping means arranged above said platform, means for simultaneously releasing said clamping means, and means for engaging the outer upper portions of material supported upon said platform when said platform is tipped.

16. The combination, with a portable vehicle, of a receiving platform pivotally mounted thereon so as to swing vertically on an axis substantially parallel with the middle line of the vehicle, means for normally retaining said platform in receiving position, a beam rigidly arranged above said platform, a carriage movably mounted on said beam, means for holding said carriage in a desired position along said beam, lifting means carried by said carriage, a yoke pivotally mounted upon the vehicle and consisting in part of a longitudinal bar adapted to engage the outer upper portion of material supported upon said platform when said platform is tipped, and means for holding said bar in inoperative or operative position.

17. The combination, with a portable vehicle, of a receiving platform pivotally mounted thereon so as to swing vertically on an axis substantially parallel with the middle line of the vehicle, means for normally retaining said platform in receiving position, a beam rigidly arranged above said platform, a carriage movably mounted on said beam, means for holding said carriage in a desired position along said beam, lifting means carried by said carriage, a plurality of clamping means arranged above said platform, a yoke pivotally mounted upon the vehicle and consisting in part of a longitudinal bar adapted to engage the outer upper portion of material supported upon said platform when said platform is tipped, and means for holding said bar in inoperative or operative position.

18. The combination, with a portable vehicle, of a pair of receiving platforms pivotally mounted thereon so as to swing vertically in opposite directions on axes substantially parallel with the middle line of the vehicle, means for normally retaining said platforms in receiving position, a beam rigidly arranged above said platforms, a carriage movably mounted on said beam, means for holding said carriage in any desired position along said beam, lifting means carried by said carriage, a plurality of clamping means arranged above said platforms, a yoke pivotally mounted upon the vehicle and consisting in part of a longitudinal bar adapted to engage the outer upper portion of material supported upon a platform when said platform is tipped, and means for holding said bar in inoperative or operative position.

19. The combination, with a portable vehicle, of a pair of longitudinally arranged vertically-tilting receiving platforms mounted thereon, a bar 50 pivotally mounted on said vehicle and adapted to be swung to either side of the medial line thereof in position to engage the upper ends of the material carried by either platform when said platform is tilted.

20. The combination, with a portable vehicle, of a pair of longitudinally arranged vertically-tilting receiving platforms mounted thereon, means for normally holding said platforms in receiving position, a bar 50 pivotally mounted on said vehicle and adapted to be swung to either side of the medial line thereof in position to engage the upper ends of the material carried by either platform when said platform is tilted.

21. The combination, with a portable vehicle, of a pair of longitudinally arranged vertically-tilting receiving platforms mounted thereon, means for normally and independently holding said platforms in receiving position, a bar 50 pivotally mounted on said vehicle and adapted to be swung to either side of the medial line thereof in position to engage the upper ends of material carried by either platform when said platform is tilted.

22. The combination, with a portable vehicle, of a pair of longitudinally arranged vertically-tilting receiving platforms mounted thereon, means for normally holding said platforms in receiving position, a bar 50 pivotally mounted on said carriage and adapted to be swung to either side of the medial line thereof in position to engage the upper ends of material carried by either platform when said platform is tilted, and means for adjusting the distance of said bar from either side of the middle of said carriage.

23. The combination, with a portable vehicle, of a pair of longitudinally arranged receiving platforms mounted thereon, a longitudinal pivotal connection between each of said platforms and the vehicle, means for shifting said platforms transversely to permit vertical swing thereof, and lifting mechanism arranged above said platform.

24. The combination, with a portable vehicle, of a pair of longitudinally arranged receiving platforms mounted thereon, a longitudinal pivotal connection between each of said platforms and the vehicle, means for normally retaining said platforms in horizontal position, means for shifting said platforms transversely to permit vertical swing thereof, and lifting mechanism arranged above said platform.

25. The combination, with a portable vehicle, of a pair of longitudinally arranged receiving platforms mounted thereon, a longitudinal pivotal connection between each of said platforms and the vehicle, means for independently shifting said platforms transversely to permit vertical swing thereof, and lifting mechanism arranged above said platform.

26. The combination, with a portable vehicle, of a pair of longitudinally arranged receiving platforms mounted thereon, a longitudinal pivotal connection between each of said platforms and the vehicle, means for normally retaining said platforms in horizontal position, means for independently shifting said platforms transversely to permit vertical swing thereof, and lifting mechanism arranged above said platform.

27. The combination, with a portable vehicle, of a pair of longitudinally arranged receiving platforms mounted thereon, a longitudinal pivotal connection between each of said platforms and the vehicle, means for normally retaining said platforms in horizontal position, means for shifting said platforms transversely to permit vertical swing thereof, a track beam rigidly mounted on said vehicle above said platforms, a carrier mounted on said track beam, means for holding said carrier in various positions along said beam, and lifting mechanism carried by said carrier.

28. The combination, with a portable vehicle, of a pair of longitudinally arranged receiving platforms mounted thereon, a longitudinal pivotal connection between each of said platforms and the vehicle, means for shifting said platforms transversely to permit vertical swing thereof, a track beam rigidly mounted on said vehicle above said platforms, a carrier mounted on said track beam, means for holding said carrier in various positions along said beam, and lifting mechanism carried by said carrier.

29. The combination, with a portable vehicle, of a pair of longitudinally arranged receiving platforms mounted thereon, a longitudinal pivotal connection between each of said platforms and the vehicle, means for normally retaining said platforms in horizontal position, means for independently shifting said platforms transversely to permit vertical swing thereof, a track beam rigidly mounted on said vehicle above said platforms, a carrier mounted on said track beam, means for holding said carrier in various positions along said beam, and lifting mechanism carried by said carrier.

30. The combination, with a portable vehicle, of a pair of longitudinally arranged receiving platforms mounted thereon, a longitudinal pivotal connection between each of said platforms and the vehicle, means for normally retaining said platforms in horizontal position, means for shifting said platforms transversely to permit vertical swing thereof, a track beam rigidly mounted on said vehicle above said platforms, a carrier mounted on said track beam, means for holding said carrier in various positions along said beam, lifting mechanism carried by said carrier, and means for engaging the outer upper portions of material carried by either of said platforms when the platforms are tilted.

31. The combination, with a portable vehicle, of a pair of longitudinally arranged receiving platforms mounted thereon, a longitudinal pivotal connection between each of said platforms and the vehicle, means for normally retaining said platforms in horizontal position, means for independently shifting said platforms transversely to permit vertical swing thereof, a track beam rigidly mounted on said vehicle above said platforms, a carrier mounted on said track beam, means for holding said carrier in various positions along said beam, lifting mechanism carried by said carrier, and means for engaging the outer upper portions of material carried by either of said platforms when the platforms are tilted.

32. The combination, with a portable vehicle, of a pair of longitudinally arranged receiving platforms mounted thereon, a longitudinal pivotal connection between each of said platforms and the vehicle, means for shifting said platforms transversely to permit vertical swing thereof, a track beam rigidly mounted on said vehicle above said platforms, a carrier mounted on said track beam, means for holding said carrier in various positions along said beam, lifting mechanism carried by said carrier, two sets of clamping means arranged above said platforms, and means for simultaneously releasing the clamping means of either set.

33. The combination, with a portable vehicle, of a pair of longitudinally arranged receiving platforms mounted thereon, a longitudinal pivotal connection between each of said platforms and the vehicle, means for normally retaining said platforms in horizontal position, means for shifting said platforms transversely to permit vertical swing thereof, a track beam rigidly mounted on said vehicle above said platforms, a carrier mounted on said track beam, means for holding said carrier in various positions along said beam, lifting mechanism carried by said carrier, two sets of clamping means arranged above said platforms, and means for simultaneously releasing the clamping means of either set.

34. The combination, with a portable vehicle, of a pair of longitudinally arranged receiving platforms mounted thereon, a longitudinal pivotal connection between each of said platforms and the vehicle, means for normally retaining said platforms in horizontal position, means for independently shifting said platforms transversely to permit vertical swing thereof, a track beam rigidly mounted on said vehicle above said platforms, a carrier mounted on said track beam, means for holding said carrier in various positions along said beam, lifting mechanism carried by said carrier, two sets of clamping means arranged above said platforms, and means for simultaneously releasing the clamping means of either set.

35. The combination, with a portable vehicle, of a pair of longitudinally arranged receiving platforms mounted thereon, a longitudinal pivotal connection between each of said platforms and the vehicle, means for normally retaining said platforms in horizontal position, means for shifting said platforms transversely to permit vertical swing thereof, a track beam rigidly mounted on said vehicle above said platforms, a carrier mounted on said track beam, means for holding said carrier in various positions along the beam, lifting mechanism carried by said carrier, means for engaging the outer upper portions of material carried by either of said platforms when the platforms are tilted, two sets of clamping means arranged above said platforms, and means for simultaneously releasing the clamping means of either set.

36. The combination, with a portable vehicle, of a longitudinal track beam rigidly supported above said vehicle, a carrier mounted on said track beam and movable along the same, lifting mechanism carried by said carrier, a pawl 23 mounted upon said carrier and adapted to engage portions of the track beam, and an operating link 25 pivoted to said pawl and adapted to be swung to either side of the vehicle, for the purpose set forth.

37. The combination, with a portable vehicle, of a longitudinal track beam rigidly supported upon said vehicle above the receiving platform thereof, a carrier mounted on said track beam, lifting means carried by said carrier, and means for holding said carrier at any desired position of adjustment on said track beam.

38. The combination, with a portable vehicle, of a longitudinal track beam rigidly supported above said vehicle, a carrier mounted on said track beam, lifting means carried by said carrier, means for holding said carrier at any desired position of adjustment on said track beam, and transversely yieldable means for operating said holding means.

39. The combination, with a portable vehicle, of a transversely movable and vertically swingable platform mounted thereon, means for holding said platform against movement during transportation and lifting mechanism arranged above said platform and movable longitudinally thereof.

40. The combination, with a portable vehicle, of a receiving platform transversely movable thereon, a longitudinal shaft upon which said platform is transversely slidable and pivoted, a cable passed around said shaft and having its opposite ends secured to the platform upon opposite sides of the shaft, and interacting means carried by the vehicle and platform for holding the platform against pivotal movement when in one of its positions.

41. The combination, with a vehicle of a transversely movable platform mounted thereon, and lifting mechanism carried by the vehicle above the platform and movable longitudinally thereof.

42. The combination, with a portable vehicle, of a load receiving member mounted thereon and adapted to be shifted from a substantially vertical position to a transporting position at an angle thereto, means for holding said member in transporting position and lifting mechanism carried by the vehicle above said load receiving member to deliver material thereto.

In witness whereof, I have hereunto set my hand and seal at Indianapolis, Indiana, this 12th day of April, A. D. one thousand nine hundred and five.

JAMES B. SCHUMAN. [L. S.]

Witnesses:
 ARTHUR M. HOOD,
 JAMES A. WALSH.